Oct. 25, 1938.   H. A. HAMM   2,134,041
FRUIT MARKING APPARATUS
Filed Sept. 12, 1936    7 Sheets-Sheet 1
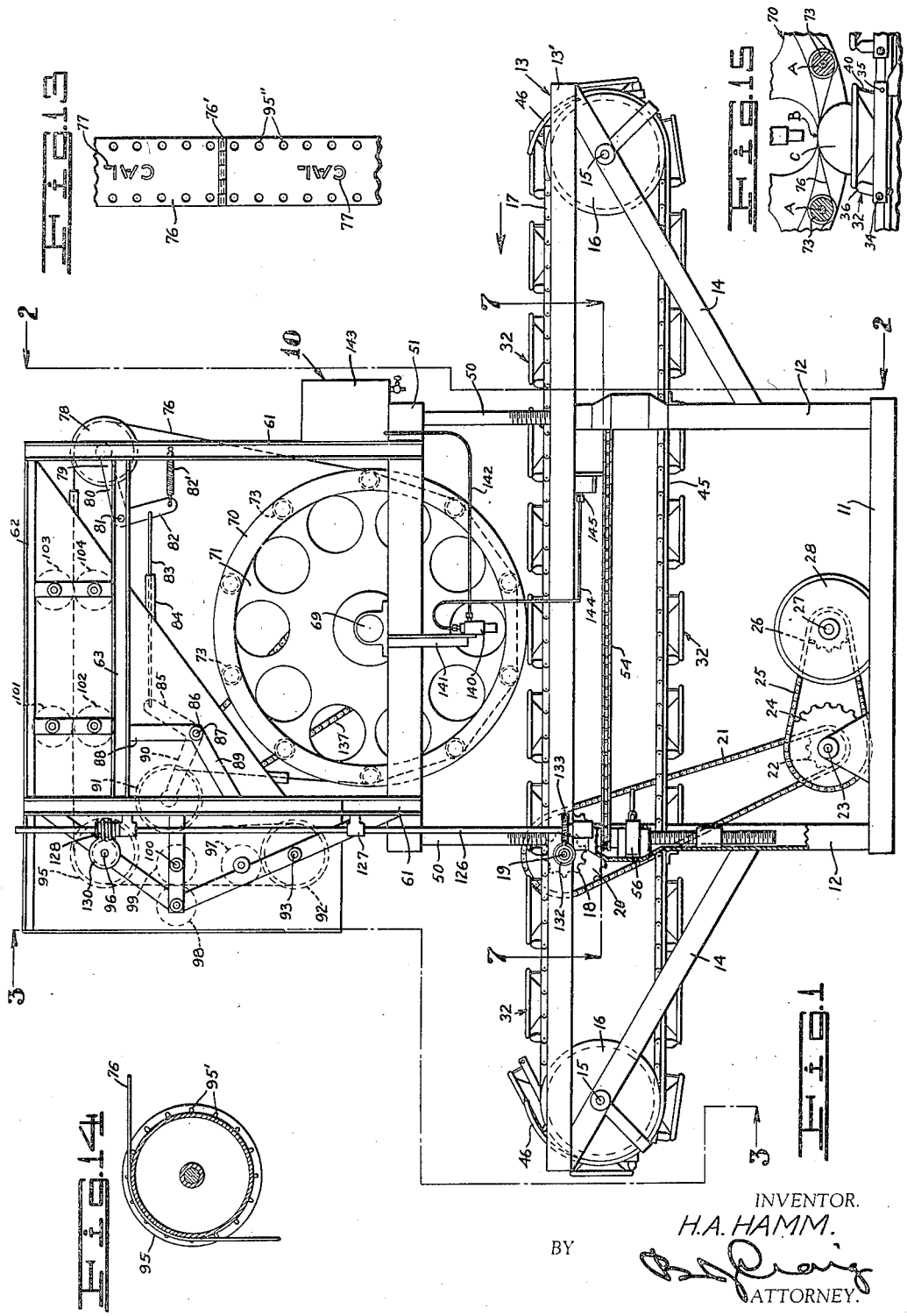
INVENTOR.
H. A. HAMM.
BY
ATTORNEY.

Oct. 25, 1938. H. A. HAMM 2,134,041
FRUIT MARKING APPARATUS
Filed Sept. 12, 1936 7 Sheets-Sheet 2
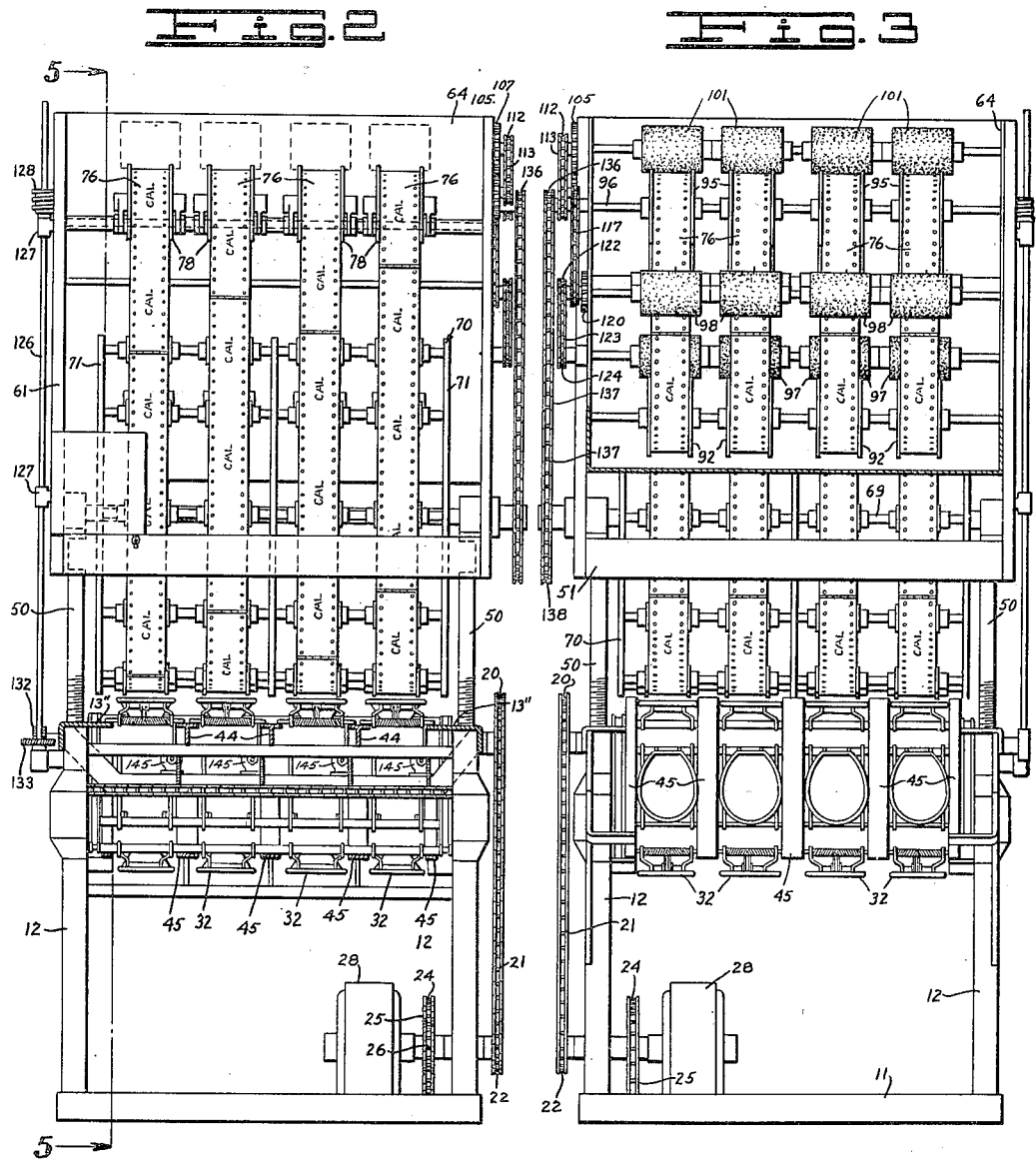
INVENTOR.
H. A. HAMM.
BY
ATTORNEY.

Oct. 25, 1938.  H. A. HAMM  2,134,041
FRUIT MARKING APPARATUS
Filed Sept. 12, 1936   7 Sheets-Sheet 3
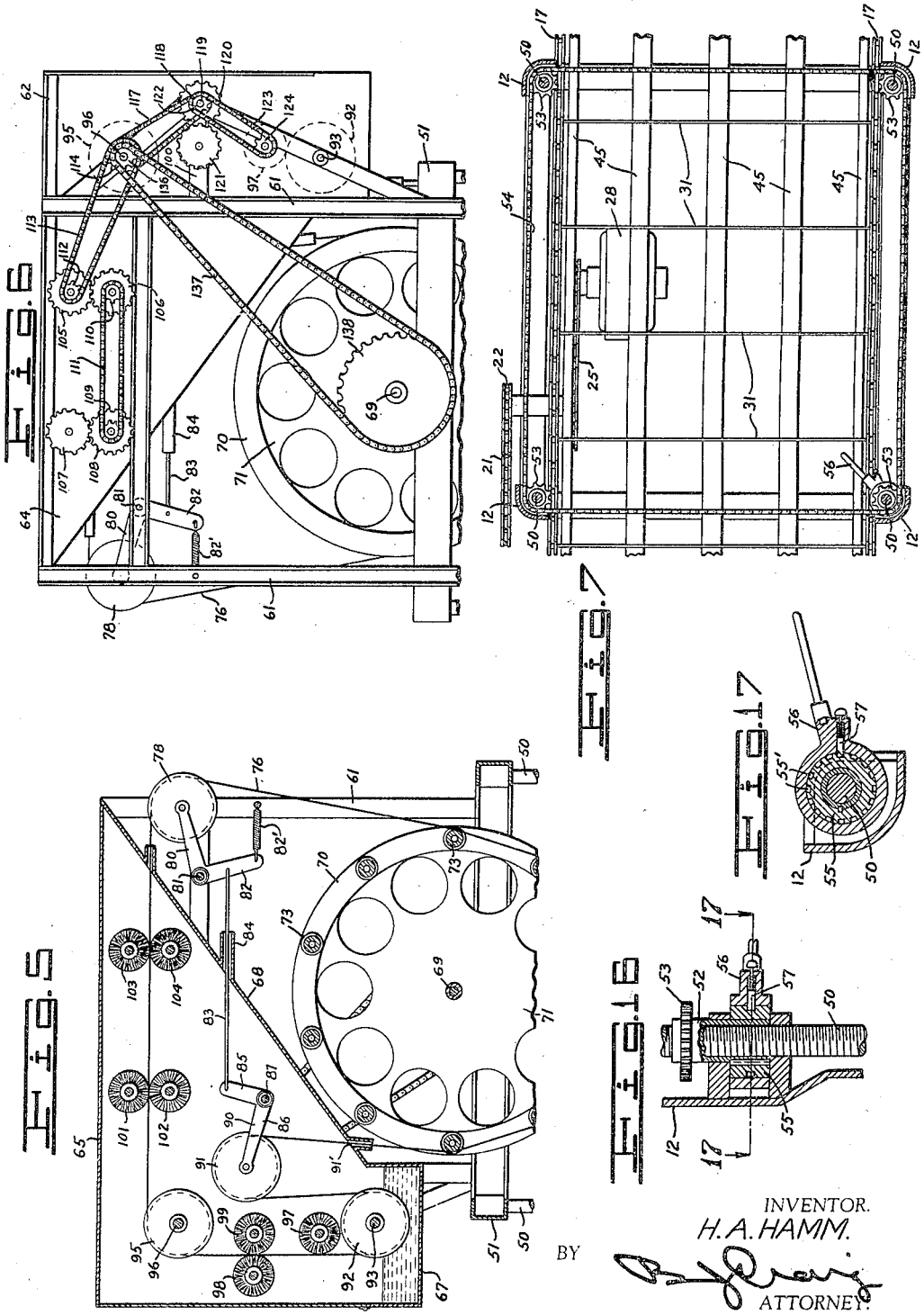
INVENTOR.
H. A. HAMM.
ATTORNEY.

Oct. 25, 1938.  H. A. HAMM  2,134,041
FRUIT MARKING APPARATUS
Filed Sept. 12, 1936   7 Sheets-Sheet 4
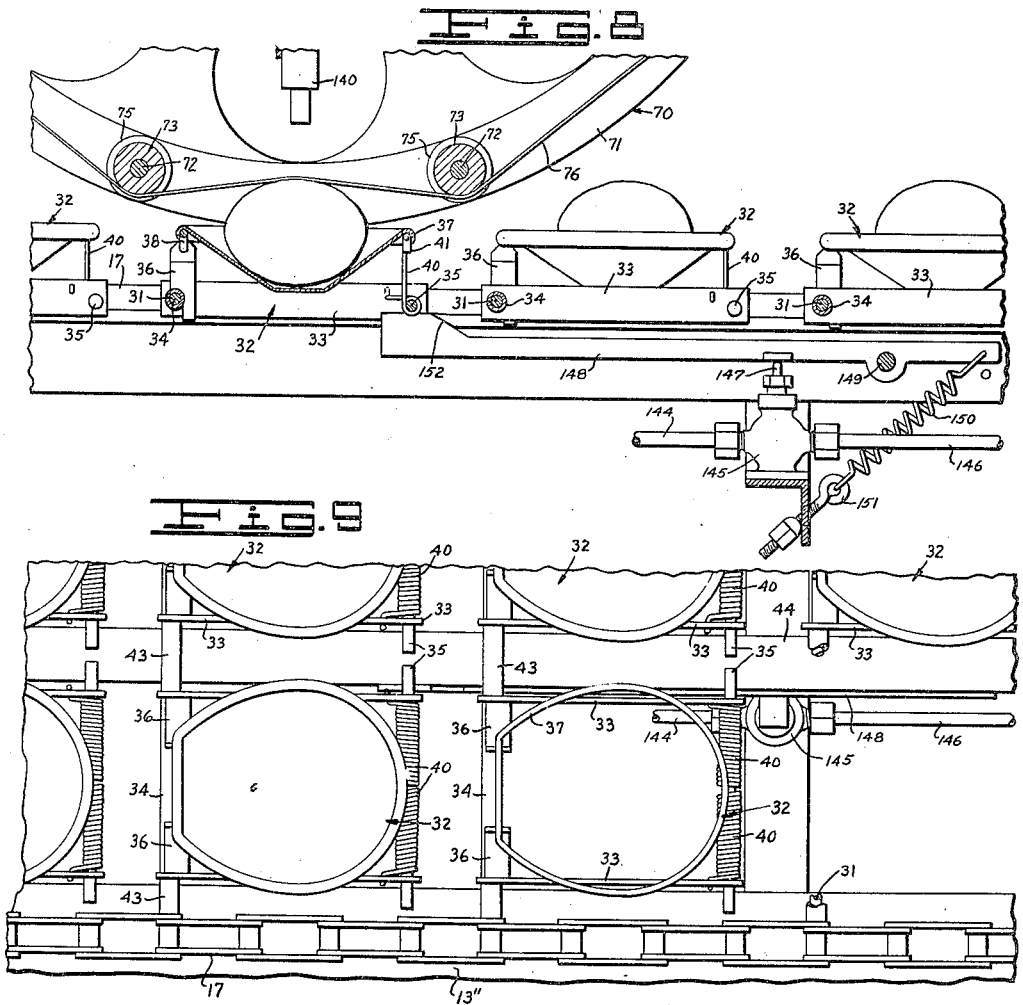
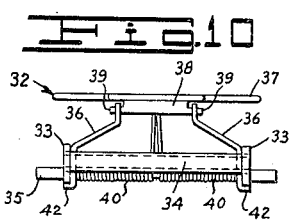
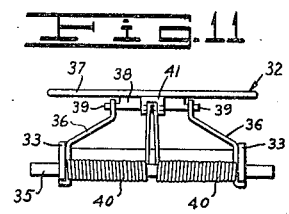
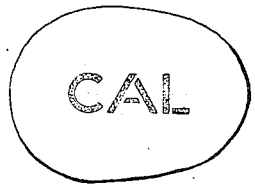
INVENTOR.
H. A. HAMM.
BY
ATTORNEY.

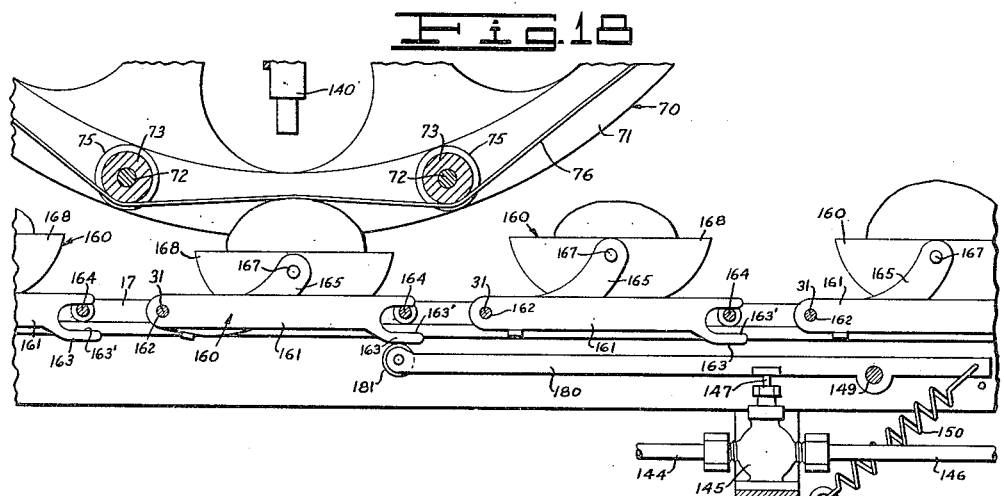

Oct. 25, 1938. H. A. HAMM 2,134,041
FRUIT MARKING APPARATUS
Filed Sept. 12, 1936 7 Sheets-Sheet 6
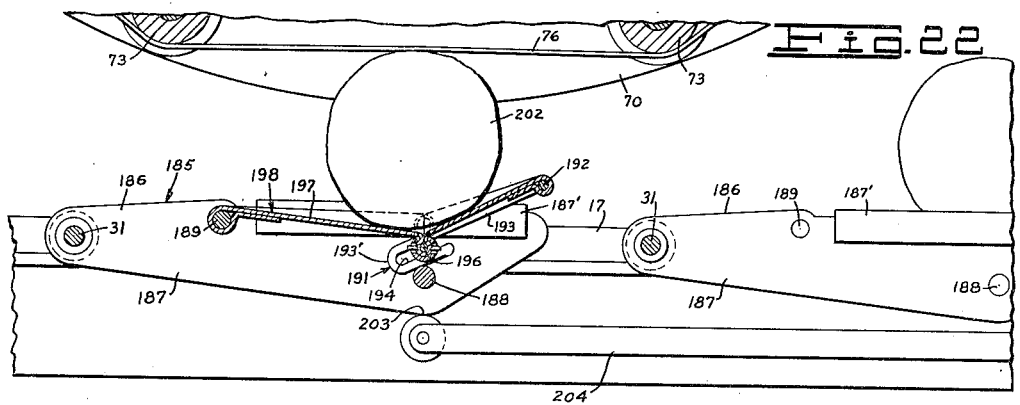
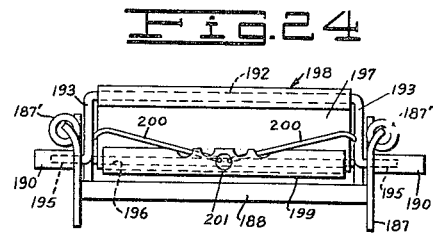
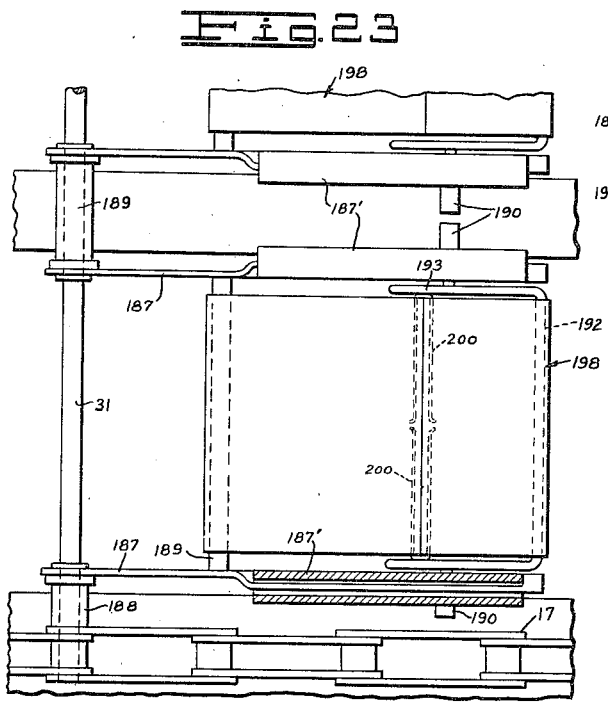
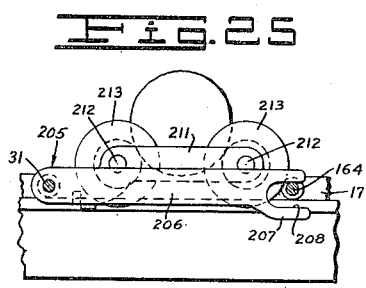
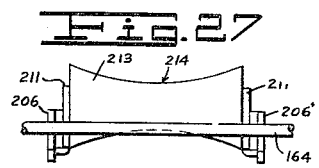
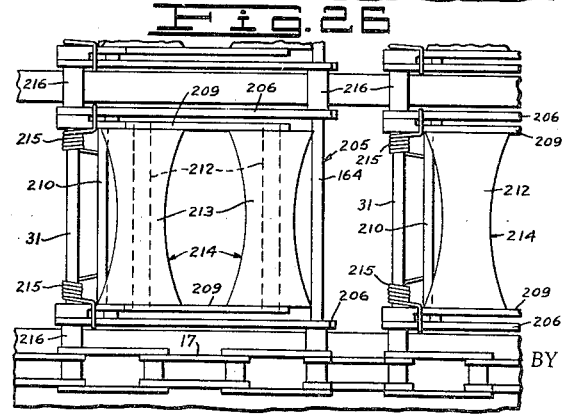
INVENTOR.
H. A. HAMM
BY
ATTORNEY.

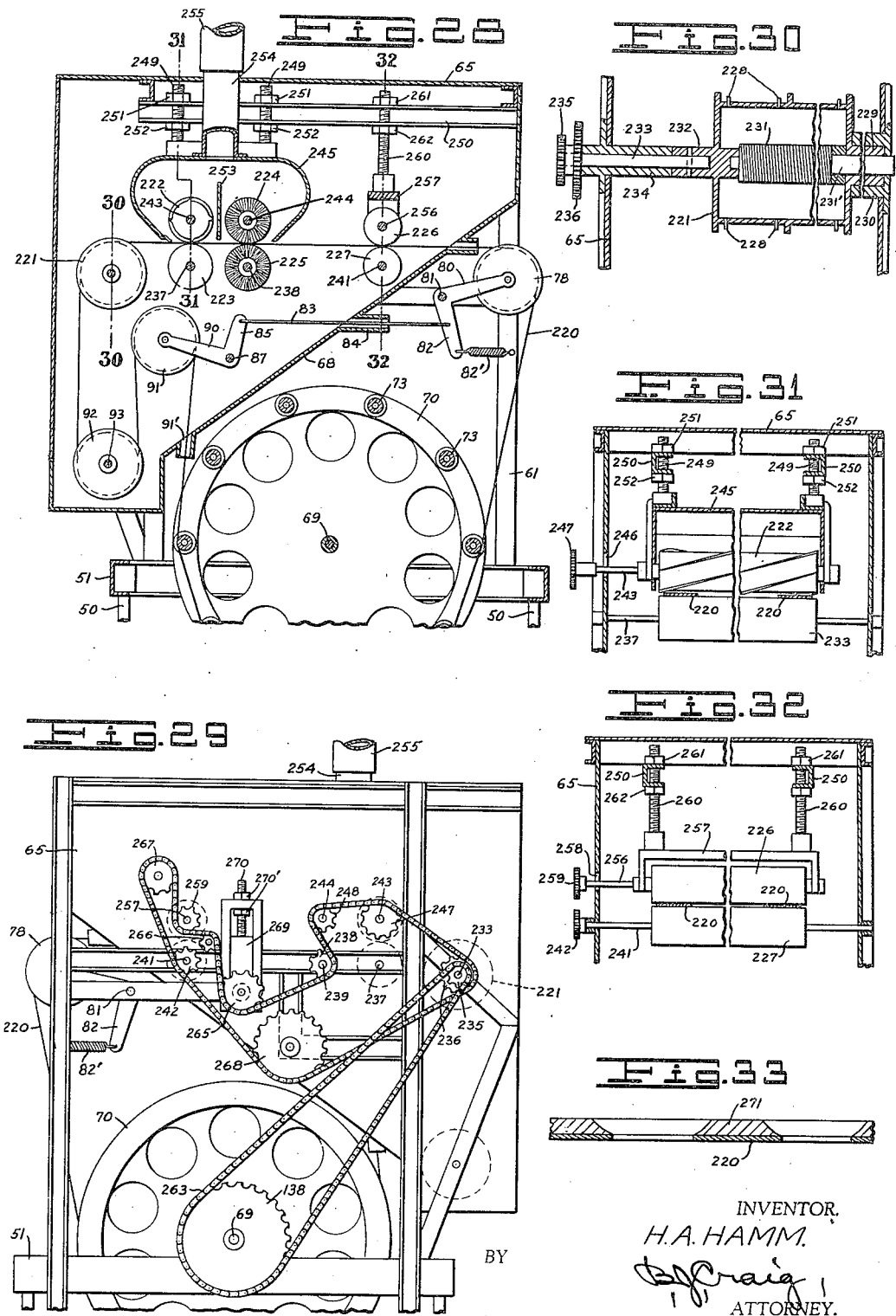

Patented Oct. 25, 1938

2,134,041

UNITED STATES PATENT OFFICE 2,134,041

FRUIT MARKING APPARATUS

Herbert A. Hamm, Pasadena, Calif.

Application September 12, 1936, Serial No. 100,474

17 Claims. (Cl. 101—122)

This invention relates to fruit marking apparatus.

The general object of the invention is to provide an improved apparatus for marking trademarks or other indicia on objects of various shapes, such as cylindrical, spherical, flat, or irregular objects.

A more specific object of the invention is to provide a novel branding machine which will handle fragile and perishable articles without damage and wherein the brand is applied in a novel manner.

A further object of the invention is to provide a novel flexible stencil and mounting therefor for use in branding objects of various shapes.

Another object of the invention is to provide a novel conveyor device for use in a branding machine.

Another object of the invention is to provide novel means for cleaning the stencil of a branding apparatus.

Another object of the invention is to provide a novel article support for use in a branding apparatus.

Another object of the invention is to provide novel adjustment for the conveyor of a branding apparatus.

Other objects and the advantages of the invention will be apparent from the following description taken in connection with the accompanying drawings, wherein:

Fig. 1 is a side elevation, partly in section, of a branding apparatus embodying the features of my invention;

Fig. 2 is a section taken on line 2—2 of Fig. 1;

Fig. 3 is a section taken on line 3—3 of Fig. 1;

Fig. 4 is an enlarged sectional detail with parts in elevation showing a spool construction;

Fig. 5 is a section taken on line 5—5 of Fig. 2;

Fig. 6 is a fragmentary, end view of the apparatus showing the stencil drive and associated parts;

Fig. 7 is a fragmentary section taken on line 7—7 of Fig. 1 with the fruit conveyors omitted;

Fig. 8 is a fragmentary, sectional view showing the fruit conveyors and the spray operating trip;

Fig. 9 is a fragmentary, top plan view of the conveyor;

Fig. 10 is a view of the following end of the fruit conveyor frames with the canvas omitted;

Fig. 11 is a view of the forward end of the fruit conveyor frames with the canvas omitted;

Fig. 12 is a plan view of the fruit showing the brand mark thereon;

Fig. 13 is a fragmentary, plan view of the stencil;

Fig. 14 is a sectional view through the stencil drive wheel;

Fig. 15 is a diagrammatic view showing the movement of the fruit basket;

Fig. 16 is an enlarged fragmentary, sectional detail of the jack mechanism;

Fig. 17 is a section taken on line 16—16 of Fig. 15;

Fig. 18 is a fragmentary, sectional view showing a modified form of conveyor frame and fruit basket;

Fig. 19 is a fragmentary, top plan view showing the modification;

Fig. 20 is an end view of the fruit basket;

Fig. 21 is a sectional view taken on line 21—21 of Fig. 19;

Fig. 22 is a view similar to Fig. 8 showing a further modification of the conveyor frame and fruit basket;

Fig. 23 is a top view of the modified frame;

Fig. 24 is an end view of the modified form of frame;

Fig. 25 is a side elevation showing a further modified form of fruit conveyor;

Fig. 26 is a top view of the modification shown in Fig. 25;

Fig. 27 is an end view of the modification shown in Fig. 25;

Fig. 28 is a sectional view similar to Fig. 25 and showing a modified form of stencil cleaning apparatus;

Fig. 29 is a fragmentary end view of the modified apparatus shown in Fig. 28;

Fig. 30 is an enlarged, fragmentary, sectional view taken on line 30—30 of Fig. 28;

Fig. 31 is a fragmentary, sectional view taken on line 31—31 of Fig. 28;

Fig. 32 is a fragmentary, sectional view taken on line 32—32 of Fig. 28; and

Fig. 33 is an enlarged, fragmentary section through the stencil tape shown in Fig. 28.

Referring to the drawings by reference characters I have shown my invention as embodied in a fruit branding apparatus which is indicated generally at 10. As shown the apparatus includes a base 11 having standards 12 thereon which support a horizontally disposed base 13. This base 13 is braced by suitable members 14 on which shafts 15 are mounted. The shafts 15 each support a pair of spaced wheels 16 over which endless chains 17 move.

These chains 17 are driven by sprockets 18 mounted on a shaft 19 on the base 13 and which has a sprocket 20 thereon which is driven by a chain 21 which passes over a sprocket 22 on a shaft 23. The shaft 23 has a sprocket 24 thereon which is driven by a chain 25. The chain 25 is driven by a sprocket 26 mounted on a shaft 27 on a motor 28 and the construction is such that when the motor operates the sprocket 18 will be rotated thus driving the two reaches of the chain 17.

The chains 17 are of the usual link type and the two chains are shown as spaced apart a sufficient distance to accommodate four conveyor members 30 therebetween. These conveyor members include rods 31 which act as pivots for the links of the chain 17 (see Fig. 7) and on these rods 31 I mount conveyor frames or fruit baskets which are indicated generally at 32. As clearly shown in Figs. 8 to 11, inclusive, each of the conveyor frames 32 includes a pair of spaced side plates 33 which are connected adjacent their front ends by a transverse tube 34 mounted on a rod 31 and adjacent the opposite ends by a rod 35 with the rod 35 at a lower elevation than the tube 34. (See Figs. 10 and 11.)

Adjacent each of the side plates the tube 34 has an upstanding arm 36 suitably secured thereto as by welding. The arms 36 support a substantially elliptical wire frame 37. Adjacent the arms 36 the frame 37 has a depending trunnion member 38 welded thereto which is pivotally connected to the arms 36 as at 39. Surrounding the rod 35 I provide a pair of torque springs 40 (see Fig. 11).

As shown one end of each of the springs 40 is suitable anchored to the adjacent side plate 33 and adjacent the center the ends of the springs 40 are suitably secured to a depending lug 41 which is welded to the frame 37. The springs 40 are arranged to urge the frame 37 towards the tube 34. To restrict this movement of the frame 37 I provide lips 42 on the arms 36 which engage the lower edges of the side plates 33.

As explained the conveyor devices 32 are positioned on the conveyor chains with the conveyor chain rods 31 positioned in the tubes 34 and suitable spacing tubes 43 are positioned between the rows of conveyor devices 32 and between the conveyor chains 17 and the adjacent devices 32 as clearly shown in Fig. 9.

The base 13 includes longitudinal side angle members 13' having an upper track surface 13" and intermediate the side members 13' the base includes a plurality of spaced longitudinal rail members 44. When the conveyor devices 32 are operatively positioned on the conveyor chains 17 the ends of the rods 35 rest on and slide along the tracks 44 and the outer ends of the rods 35 of the outer conveyor devices rest on and slide along the track surface 13" of the side members 13'.

The mounting of the fruit basket compensates for any difference in speed between the portion of the stencil over the top of the fruit and the speed of the chain.

Normally the pitch diameter line of the drum i. e. the centers A of the spools and the chain travel at the same speed but when the stencil projects above the pitch line of the drum as at B in Fig. 15 when a large fruit C is engaged the stencil at this point travels slower than the chain. So with the fruit basket constructed as it is it swings rearwardly moving it slightly away from the drum center against the action of the springs 40 and also causing a slight rearward movement of the basket relative to the chains 17. This movement retains the fruit in a proper relation to the stencil during a spraying operation so that the stencil mark is not blurred.

Adjacent the under reach of the conveyor chain I provide a plurality of spaced longitudinal tracks 45 which match the upper tracks 44 and support the rods 35 of the conveyor devices 32 when along the under reach of the conveyor chain. As shown at 46 in Fig. 1 each end of the tracks 45 is curved upward to receive the rods 35 of the conveyor devices 32.

Mounted in each of the standards 12 I show a rod 50 the lower portion of which is threaded and the upper end of which supports a frame 51. As clearly shown in Figs. 16 and 17 a threaded sleeve 52 is positioned on the threaded portion of each of the rods 50 and has a sprocket wheel 53 thereon. All the sprockets 53 are connected by a sprocket chain 54 as clearly shown in Fig. 7.

Surrounding one of the sleeves 52 and suitably secured thereto by a key I provide a ratchet hub 55 having a plurality of equally spaced ratchet grooves 55' spaced therearound. Surrounding the ratchet hub 55 I provide a ratchet wrench 56 which may be of any desired type having a reversible pawl 57 to engage the ratchet grooves 56' of the ratchet hub to rotate the hub in either one direction or the other.

When the ratchet wrench 57 is rotated it will rotate the ratchet hub 56 which in turn will rotate the associated sleeve 52 and sprocket 53 which in turn will move the sprocket chain 54. When the sprocket chain 54 is thus moved it will rotate the other sprocket wheels 53 thus causing all the rods 50 to move either upwardly or downwardly depending upon the direction of rotation of the sprockets thereby either raising or lowering the frame 51 to accommodate articles having a wide range of sizes.

Vertical channel members 61 extend from the top of the frame 51. These channel members are shown as connected at their upper ends by angle bars 62 and intermediate their ends by channel bars 63. Supported between the members 61 and 63 I show a tank or receptacle 64 which has a top wall 65, an end wall 66, a bottom wall 67, and an inclined bottom wall 68, as clearly shown in Figs. 5 and 6.

Mounted on the frame 51 I show a shaft 69 which supports a drum 70 which consists of end members 71 connected by transverse shafts 72 on which spool members 73 (see Fig. 4) are rotatably mounted and which are held spaced apart by sleeves 74. Each of the spool members includes an outwardly directed flange 75 adjacent each end which serves to guide a stencil member 76 which may be made of spring brass or other suitable material and which comprises a series of connected sections removably united by a hinge 76' to form an endless band. The stencil member 76 is provided with suitable apertures 77 through which material is sprayed to effect the branding operation.

Each of the stencils 76 is supported on the drum 70 and on an idle roller 78 which is mounted on one arm 79 of a bell crank 80 which is pivoted as at 81 and the other arm 82 of which is engaged by a spring 82' to normally pull the bell crank to one position. The arm 82 is engaged by a rod 83 which passes through a tube 84 in the wall of the bottom 68 of the receptacle and which is connected to an arm 85 of a bell crank 86 which is pivoted as at 87 on a shaft which is supported on the member 63 and on brackets 89 supported on the vertical member 61. The other arm 90 of the bell crank supports a roller 91 from which the stencil 76 continues from the drum 70.

After passing through slots 91' in the bottom 68 the stencil members pass over the rollers 91 and each passes down to a roller 92 mounted on a shaft 93 arranged on a bracket 94, whence it passes to a roller 95 arranged on a shaft 96 from which it passes on to the roller 78. The rollers 95 are provided with pins 95' which fit in holes 95" in the stencil so that when the rollers 95 are rotated the stencils will be driven.

The purpose of the rollers 78 and 91 is to take up slack and maintain proper tension in the stencil 76. Since the roller 91 serves to take up tension in two reaches of the stencil while the roller 78 serves to take up tension in one reach I preferably attach the rod 83 to the arms 85 and 82 so that the effective length of the arm 85 is twice that of the arm 82.

Arranged on the receptacle 65 and rotatably mounted on the walls thereof I show brushes 97 which are mounted directly above the rollers 92. Above each brush 97 I show a pair of brushes 98 and 99 which are supported in adjacent relation on bars 100 disposed on the container 64. Between the rollers 78 and 95 I provide two pairs of brushes 101, 102, 103, and 104. The brushes 101, 102, 103, and 104 have spur gears 105, 106, 107, and 108, respectively, mounted thereon, and coaxial with the gears 106 and 108 are sprocket gears 109 and 110 over which a chain 111 passes.

Coaxial with the gear 108 I show a sprocket gear 112 over which a chain 113 passes and which is driven by a sprocket 114 on the shaft 96. On the shaft 96 is another sprocket 116 by which a chain 117 is driven. The chain 117 passes over a sprocket 118 on a shaft 119 and on this shaft 119 is a gear 120 which meshes with a gear 121. The gears 120 and 121 are mounted on the brushes 99 and 98, respectively. The shaft 119 is provided with a sprocket 122 which drives a chain 123 and a sprocket 124 on a shaft 125 which supports the brushes 97. The brushes 97 contact the rollers 92 previously described.

In order to drive the stencils a shaft 126 mounted in brackets 127 on one of the channel members 61 has a worm 128 thereon which meshes with a worm wheel 130 on the shaft 96. The shaft 19 has worm 132 mounted thereon which meshes with a worm wheel 133 splined on the shaft 126 so that it may slide therealong when the frame 51 is being raised.

In order to drive the drum 70 I provide a sprocket 136 on the shaft 96 and this sprocket drives a chain 137 on a sprocket 138 mounted on the shaft 69.

From the foregoing it will be apparent that when the motor 120 operates the shaft 96 will be driven and consequently the stencil will be advanced and the brushes will operate to engage the stencil.

In order to mark through the stencil brand 77 onto the fruit I mount a nozzle 140 of a stencil spraying apparatus on a support 141 arranged on the frame 51. The nozzle is directed downwardly as shown in Fig. 1 and is connected by a pipe 142 to a container 143 for branding material. The nozzle 140 is connected as shown in Fig. 1 by a pipe 144 with a control valve 145 (see Fig. 8). The control valve 145 communicates through a pipe 146 with a suitable source of compressed air not shown and the valve 145 is provided with an operating stem 147 which is engaged by an operating lever 148 pivoted as at 149 to the frame 51. The lever 148 is normally urged so that the valve remains closed due to a spring 150 pulling the lever. The spring engages an eye bolt 151. The lever is provided with an inclined surface 152 which is engaged by one of the rods 35 as shown in Fig. 8. The valve 145 is so set that the weight of the conveyor frame alone will not be sufficient to open the valve but will require that the weight of a fruit on the conveyor will be necessary in order to open the valve; thus when any empty conveyor frames pass the spraying station there would be no discharge of the branding material on the empty frame.

In the operation of my apparatus fruit is placed in the frames 32 in any suitable manner and as these frames advance each passes beneath the stencil marking portion 77.

As previously described the flexible mounting of the fruit carriage and the stencil allows for various sizes of the fruit. When the fruit is at the spraying station below the nozzle 140 the valve 145 is operated by the rocking of the lever 148 so that the fruit is branded after which it passes on to be packed. The stencil moves away from the spraying station and enters the tank 64. In this tank I provide a suitable solvent for a stencil material and the stencil passes through this solvent thence upwardly where it is in the solvent and the branding material is wiped off by the brushes after which the stencil returns to its former position and the operation is repeated.

As branding material I may use vegetable lacquer and as a solvent for wiping off the branding material I may use lacquer thinner. All the other material may be employed as desired.

In Figs. 18 to 21, inclusive, I have indicated a modified form of conveyor member generally at 160. As shown each of the conveyor members 160 includes spaced side plates 161 apertured as at 162 adjacent their leading ends to receive the chain rods 31. The opposite or rear ends of the plates 161 include a dependent portion 163 having an elongated notch 163' therein in which a rod 164 is positioned. The rods 164 like the rods 31 act as pivots for certain of the links of the chains 17.

Pivotally mounted on the rod 31 adjacent the side plates 161 I provide arms 165 which are connected by a transverse bar 166. The arms 165 curve upwardly to a point intermediate the rods 31 and 164 where they are pivotally secured as at 167 to a basket member 168. As shown the basket member 168 is bowl-shaped and has the inner surface thereof covered with felt or other suitable material as indicated at 169.

A coiled torque spring 170 surrounding the rod 31 adjacent each of the arms 165 and having one end hooked over the top of the adjacent side plate 161 and the opposite end hooked under the transverse bore 166 resiliently retains the arms 165 and the basket 168 in a raised position. Secured to the transverse bar 166 I provide a rod 171 which extends towards the rod 164 and has an enlarged head 172 thereon.

The basket 168 has an apertured lug 173 depending therefrom in which the rod 171 is positioned. Washers 174 are provided on the rod 171 on each side of the lug 173 and adjacent the transverse bar 166 the rod 171 has a sleeve 175 thereon which includes an enlarged head 176. Surrounding the rod 171 between the sleeve head 176 and the lug 173 I provide a coiled spring 177 and surrounding the rod 171 between the head 172 thereof and the lug 173 I provide a similar coiled spring 178.

When the conveyor devices are operatively assembled suitable spacing tubes 179 are positioned between the rows of conveyor devices 160 and between the conveyor chains 17 and the adjacent devices 160 as clearly shown in Fig. 19.

When the conveyor devices 160 are used the valve operating arm 148 is replaced by a valve operating arm 180 which at its forward end has a roller 181 thereon which is adapted to be engaged by the enlarged portion 163 of one of the side plates 161 to actuate the arm 180 to operate the valve 145 in the same manner as previously descibed in connection with the conveyor devices 32.

In Figs. 22, 23, and 24 I have shown a modified form of conveyor mechanism which is indicated generally at 185. As shown this conveyor mechanism includes a plurality of conveyor members 186 each of which includes a pair of opposing side plates 187, the front ends of which are apertured to receive the rods 31 which serve as links of the chain 17. Suitable sleeves 188 and 189 serve to space the side plates 187 apart. Adjacent the rear the side plates 187 are secured together by a rod 188. Intermediate the rod 188 and the rod 31 a rod 189 connects the side plates 187. Above and in the rear of the rod 188 each of the side plates 187 has an outwardly projecting pin 190 thereon. Adjacent the rear of the conveyor member I provide a frame 191 which is made of a single length of wire.

As shown the frame 191 includes a straight transverse reach 192 and side reaches 193 extending forward past the rod 188 where it curves downwardly and rearwardly as at 193 forming an elongated slot 194. The ends of the frame wire are pivotally mounted in the pins 190 as indicated at 195. (See Fig. 24.) Positioned in the slots 194 of the frame 191 I provide a rod 196. The frame 191 forms in connection with a strip of canvas 197 a conveyor pocket member 198. As shown one end of the canvas 197 is secured to the rod 189 and extends forwardly passing under the rod 196 and thence over the rod 192 to which it is secured. The canvas 197 is secured to the rod 196 by an elongated metal clamping band 199. Adjacent the rod 196 U-shaped spring members 200 are provided. The ends of the spring members 200 are positioned in apertures 201 of the clamp 199 and extend outwardly around the sides of the canvas 197. The tension of the springs 200 resiliently retains the rear end of the pocket raised above the forward end as clearly shown in Fig. 22.

The compensating action described in connection with the conveyor members 32 is taken care of by the frame 191. For example, when the fruit 202 passes the drum 70 the frame 191 swings downwardly and rearwardly to compensate for the difference in travel of the stencil and the conveyor device. Adjacent the pocket 198 each of the side plates 187 has a rubber cushioning member 187' thereon to prevent the fruit from coming in contact with the edges of the side plates.

The side plates 187 taper downwardly to a low point 203 below the rod 188 and then incline upward to form a cam portion for actuating a lever arm 204 which is adapted to actuate a paint spray air control valve similar to the previously described control valve 145.

In Figs. 25, 26, and 27, I have indicated a modified form of conveyor member generally at 205. As shown the conveyor member 205 includes spaced side plates which are apertured adjacent their leading ends to receive the rods 31 of the chains 17. The opposite or rear ends of the plates 206 include depending portions 207 having an elongated notch 208 therein in which the rod 164 is positioned.

Pivotally mounted on the rod 31 adjacent the side plates 206 I provide arms 209 which are connected by a transverse bar 210. Forward of the bar 210 the arms 209 curve upwardly and then extend rearwardly in a straight portion 211. Secured to the portions 211 of the arms 209 I provide a pair of spaced transverse rods 212 which have roller members 213 pivotally mounted thereon. As shown in Figs. 26 and 27 the roller members 213 are formed arcuate as indicated at 214.

A coiled torque spring 215 surrounds the rod 31 adjacent each of the arms 209 and has one end hooked over the top of the adjacent side plate 206 and the opposite end hooked under the transverse bar 210 resiliently retains the arms and the rollers 213 in a raised position.

When the conveyor devices 205 are operatively assembled suitable spacing sleeves 216 are positioned between the rows of conveyor devices 205 and between the chains 17 and the adjacent conveyor devices as shown in Fig. 26.

When the conveyor devices 205 are used the depending portion 207 of one of the side plates is adapted to actuate a paint spray air valve lever arm as previously described in connection with the conveyor devices 160.

In Figs. 28 to 33 I have shown a modified form of stencil tape which is indicated at 220 and a modified form of stencil cleaning mechanism. As shown the stencil tape 220 comprises an endless strip of heavy paper or other suitable flexible material.

When the stencil tape 220 is used the drive drums 95 and the brushes 97, 98, 101, 102, 103, and 104, together with their associated drive mechanisms are omitted and replaced by devices to be hereinafter described.

When the stencil 220 is used it is positioned over the idle roller 78 and extends downward and over the spool members 73 of the drum 70 and thence upwardly through a slot 91' and over idle roller 91 and then downwardly and around the idle roller 92 in the same manner as previously described in connection with the stencil 76.

From the idle roller 92 the stencil 220 extends upward over a drive drum 221 and thence horizontally to the idle roller 78 passing between a cutting roller 222 and its associated roller 223 and between a pair of brushes 224 and 225 and between a pair of smoothing rollers 226 and 227. The drive drum 221 is provided with pins 228 which fit in suitable holes in the stencil 220 so that when the drum 221 rotates the stencil 220 will be driven in the same manner as previously described in connection with the stencil 76. (See Fig. 30.)

The drive drum 221 is formed hollow and at one end has a hub portion 229 which is rotatably mounted in a boss 230 on the container 65. Positioned in the drum I provide an electric heating coil 231 the lead wires of which extend out of the drum and container through a suitable insulated tube 231 positioned in the hub 229. Opposite the hub 229 the drum includes a boss 232 having a shaft 233 secured thereto which is rotatably mounted in a bearing member 234 on the container. Secured to the shaft 233 I provide sprocket gears 235 and 236.

The roller 223 is suitably secured to a shaft 237 which is suitably rotatably supported on the container. The brush 225 is secured to a shaft 238 which is suitably rotatably supported on the container 65 and has a gear 239 secured thereto. (See Fig. 29.) The smoothing roller 227 is secured to a shaft 241 which is suitably rotatably supported on the container 65 and has a sprocket 242 secured thereto.

The knife roller 222 is mounted on a shaft 243 and the brush 224 is mounted on a shaft 244. The shafts 243 and 244 are rotatably supported in a frame 245 and extend out of the container 65 through suitable apertures 246. (See Fig. 31.) The shaft 243 has a sprocket 247 thereon and the shaft 244 has a sprocket 248 thereon.

The frame 245 adjacent each side includes a pair of spaced vertical threaded rods 249 which extend through suitable supports 250 mounted on the container 65. The rods 249 are supported by nuts 251 thereon by means of which the frame may be raised or lowered. Lock nuts 252 on the rods 249 retain the frame in an adjusted position.

The frame 245 is in the shape of a hollow container having the bottom thereof open and preferably has a transverse partition 253 between the knife roller 222 and the brush 224. The frame 245 has a conduit member 254 thereon which opens into the interior of the frame and the conduit 254 connects with a flexible tube 255 which communicates with a suitable suction device not shown.

The smoothing roller 226 is secured to a shaft 256 which is rotatably supported in an inverted U-shaped frame 257. The shaft 256 extends out of the container 65 through a suitable aperture 258 and has a sprocket 259 secured thereto. (See Figs. 29 and 32.) Adjacent each side the frame 257 includes vertical threaded rods 260 which extend through the supports 250. The rods 260 are supported by nuts 261 by means of which the rods and frame may be either raised or lowered and lock nuts 262 retain the frame in an adjusted position.

In operation the knife roller 222 and the brush 224 are preferably spaced above the stencil 220 a distance approximately three times the thickness of the stencil so that as the device operates a layer of spray-material builds up on the stencil to approximately three times the thickness of the stencil as indicated at 271 in Fig. 33.

The sprocket 235 is driven from the drum sprocket 138 by a sprocket chain 263. The sprockets 247, 248, 239, 259, and 242 are all driven from the sprocket 236 by an endless sprocket chain 264.

As shown the sprocket chain 264 passes over the sprocket 236 and over the sprockets 247 and 248 thence back and under the sprocket 239, under an idler sprocket 265, over an idler sprocket 266, under the sprocket 259 and then upward and over an idler sprocket 267, thence downward under the sprocket 242 and then continues downward and under an idler sprocket 268 and thence upward to the sprocket 235. The idler sprocket 265 is suitably mounted on an adjustable support 269 which includes a threaded rod 270 having nuts 270' thereon by means of which the support may be moved to adjusted positions to retain the chain 263 in contact with its associated sprockets when the frame 245 or the frame 257 is moved.

When the device is operating the heating coil 231 in the drive drum 221 is operated to heat the drum and as the stencil passes thereover the heat from the drum dries the spray material collected on the stencil. As the stencil passes the knife roller 222 the excess amount of spray material over the predetermined thickness is removed from the stencil and as the stencil passes between the brushes 224 and 225 any shavings or dust thereon are brushed off. The suction device draws all the shavings from the knife roller and the refuse from the brushes off the stencil and out of the frame 245 through the conduit 254 and the tube 255.

When the stencil passes between the ironing rollers 226 and 227 any lumps on the stencil are ironed smooth and the accumulated spray material may also be smoothed.

From the foregoing description it will be apparent that I have invented a novel fruit branding apparatus which can be economically manufactured and which is highly efficient in use.

Having thus described my invention I claim:

1. In a fruit branding machine, a frame, a horizontal conveyor on the frame, a plurality of fruit holding members resiliently mounted on said conveyor, a drum adjacent said conveyor, an endless flexible stencil member, means to resiliently support said stencil member on said drum, means to move said drum and conveyor so that the marking areas of the stencil member are aligned during movement each with a fruit holding member, a stenciling station and a spraying device at the stenciling station.

2. In a fruit branding machine, a frame, a horizontal conveyor on the frame, a plurality of fruit holding frames resiliently mounted on said conveyor, a drum adjacent said conveyor, an endless stencil member engaging said drum, rollers on said frame and engaging said stencil member, certain of said rollers being resiliently supported to provide uniform tension in the stencil, means to move said drum and conveyor so that the marking areas of the stencil members are aligned during movement each with a fruit holding frame.

3. In a fruit branding machine, a frame, a horizontal conveyor on the frame, a plurality of fruit holding frames resiliently mounted on said conveyor, a drum adjacent said conveyor, said drum having spaced transversely extending spools thereon, an endless flexible stencil member engaging said spools, rollers on said frame and engaging said stencil member, certain of said rollers being resiliently supported to provide uniform tension in the stencil and means to advance said drum and conveyor so that the marking areas of the stencil members are each aligned during movement with a fruit holding frame.

4. In a fruit marking device, a marking station, a conveyor having a fruit holding member thereon, means to move said conveyor to said station, a flexible ribbon stencil, means to cause the stencil to engage a fruit in said member and to advance therewith, means to resiliently support said stencil, said fruit holding member being pivotally mounted to move towards and away from said stencil and means to resiliently urge said fruit holding member towards the stencil.

5. In a fruit marking apparatus, a base, means to support said base, a plurality of wheels supported on said base, chains mounted on said wheels, means to drive said chains, a plurality of conveyor devices, means to pivotally mount one end of each of said conveyor devices on said chains, other means to pivotally mount the other end of said conveyor devices, a fruit holding frame mounted on each of said conveyor devices and resilient means to urge said conveyor devices in one direction on their pivots.

6. In a fruit branding machine, a frame, a horizontal conveyor on the frame, a plurality of fruit holding frames resiliently mounted on said conveyor, a drum adjacent said conveyor, an endless flexible stencil member engaging said drum, rollers on said frame and engaging said stencil member, certain of said rollers being resiliently supported to provide uniform tension in the stencil, means to move said drum and conveyor so that the marking areas of the stencil members are aligned during movement each with a conveying frame, a stenciling station, a spraying device at the stenciling station, a receptacle for stenciling material connected to the spraying device and means to actuate the spraying device.

7. In a fruit branding machine, a frame, a horizontal conveyor on the frame, a plurality of fruit holding frames on said conveyor, a drum adjacent said conveyor, said drum having transversely extending spaced spools thereon, an endless flexible stencil member engaging said spools, rollers on said frame and engaging said stencil member, certain of said rollers being resiliently supported to provide uniform tension in the stencil, means to advance said drum and conveyor so that the marking areas of the stencil members are each aligned during movement with a conveying frame, a stenciling station, a spraying device at the stenciling station, a receptacle for stenciling material connected to the spraying device and means operated by the fruit holding frames to actuate the spraying device.

8. In a fruit branding machine, a pair of conveyor members mounted to move together in the same direction, a fruit holder resiliently mounted on one conveyor and an endless flexible stencil member resiliently engaging the other conveyor, means to move said conveyors so that the marking areas of the stencil members are aligned during movement each with a fruit holder, a stenciling station, a spraying device at the stenciling station, and means to clean the stencil after each spraying operation.

9. In a fruit branding machine, a frame, a horizontal endless conveyor having resiliently mounted fruit holding members thereon, a drum adjacent said conveyor, an endless flexible stencil member resiliently engaging said drum, means to move said drum and conveyor together so that the marking areas of the stencil members are aligned during movement each with a conveying frame, a stenciling station, a spraying device at the stenciling station, a tank, means to guide the stencil through said tank and means in the tank to clean the stencil.

10. In a fruit marking apparatus, a continuously moving conveyor, a plurality of fruit baskets pivotally and resiliently mounted on the conveyor, means normally urging said fruit baskets away from the conveyor, a continuous, flexible stencil resiliently mounted above the fruit baskets and movable parallel to and together with the fruit baskets and spray means associated with said stencil.

11. In a fruit marking apparatus, a base, a plurality of wheels mounted on said base, chains on said wheels, means to drive said chains, a plurality of fruit baskets, a plurality of sets of pairs of arms pivotally mounted on the chains, means on the arms pivotally engaging the fruit baskets, resilient means normally urging said fruit baskets upwardly, a flexible stencil resiliently movably mounted above the fruit baskets, a spraying device above the stencil, and means operated by said baskets for actuating said spraying device.

12. In a fruit branding machine, a frame, a horizontal conveyor on the frame, a plurality of fruit holding frames on said conveyor, a drum adjacent said conveyor, said drum having transversely extending spools thereon, an endless flexible stencil member engaging said spools, means to move said drum and conveyor so that the marking areas of the stencil members are aligned during movement each with a conveying frame, a drive drum, a knife roller engaging said stencil member, a backing roller positioned in line with said knife roller and urging the stencil member against the knife roller and a pair of superimposed roller brushes positioned beyond said knife roller, said stencil member being disposed between said roller brushes and means to drive said knife roller and said upper roller brush.

13. In a fruit marking machine, a travelling stencilling mechanism provided with a series of stencilling apertures, means operable in timed relation to said stencilling mechanism for feeding a procession of fruit into operative relation with said stencilling apertures, means for marking the fruit through said stencilling apertures, and means for cleaning said stencilling apertures after each marking operation thereof.

14. In a fruit marking machine, a flexible stencil, means for presenting fruit into operative engagement therewith to flex the stencil into conformity with the contour of the fruit, and means for applying a marking material through the stencil onto fruit presented thereto.

15. In a fruit branding apparatus, a frame, a horizontal conveyor on the frame, a plurality of fruit holding frames on said conveyor, a drum adjacent said conveyor, said drum having transversely extending spools thereon, an endless flexible stencil member engaging said spools, a pair of idler rollers on said frame and engaging said stencil member, said idler rollers being resiliently supported to provide tension in the stencil, means to move said drum and conveyor so that the marking areas of the stencil members are aligned during movement each with a conveying frame, a drive drum intermediate said idler rollers, means to drive said drive drum.

16. In a fruit marking machine, a travelling flexible resiliently supported stencilling mechanism provided with a series of stencilling apertures, resiliently supported means movable parallel to the stencilling mechanism and operable in timed relation to said stencilling mechanism for feeding a procession of fruit into operative relation with said stencilling apertures, means for marking the fruit through said stencilling apertures, and means for cleaning said stencilling apertures after each marking operation thereof.

17. In a fruit marking machine, a continuously moving flexible resiliently mounted stencil, resiliently mounted means movable parallel to the stencil for presenting fruit into operative engagement therewith to flex the stencil into conformity with the contour of the fruit, and means for applying a marking material through the stencil onto fruit presented thereto.

HERBERT A. HAMM.